United States Patent
Cheng

(10) Patent No.: US 11,347,103 B1
(45) Date of Patent: May 31, 2022

(54) BACKLIGHT MODULE

(71) Applicant: Sunrise Optronics Co., Ltd, Taoyuan (TW)

(72) Inventor: Wen-Feng Cheng, Taoyuan (TW)

( * ) Notice: Subject to any disclaimer, the term of this patent is extended or adjusted under 35 U.S.C. 154(b) by 0 days.

(21) Appl. No.: 17/523,942

(22) Filed: Nov. 11, 2021

(30) Foreign Application Priority Data

Jul. 16, 2021 (TW) .................. 110126308

(51) Int. Cl.
*G02F 1/13357* (2006.01)
*G02F 1/1335* (2006.01)

(52) U.S. Cl.
CPC .. *G02F 1/133607* (2021.01); *G02F 1/133603* (2013.01)

(58) Field of Classification Search
CPC .................... G02F 1/133602–133613
See application file for complete search history.

(56) References Cited

U.S. PATENT DOCUMENTS

| | | | | |
|---|---|---|---|---|
| 11,009,651 | B2* | 5/2021 | Chen | G02B 6/0068 |
| 2006/0012993 | A1* | 1/2006 | Ohkawa | G02B 3/0031 |
| | | | | 362/240 |
| 2009/0324890 | A1 | 12/2009 | Wu et al. | |
| 2010/0053954 | A1 | 3/2010 | Chao et al. | |
| 2015/0253626 | A1* | 9/2015 | Zhang | G02F 1/134309 |
| | | | | 362/97.1 |
| 2016/0216561 | A1* | 7/2016 | Lee | G02F 1/133606 |
| 2019/0137829 | A1* | 5/2019 | Kim | G02F 1/133605 |

FOREIGN PATENT DOCUMENTS

| | | |
|---|---|---|
| CN | 203759283 U | 8/2014 |
| CN | 212342177 U | 1/2021 |
| TW | 201001005 | 1/2010 |
| TW | 202113269 | 4/2021 |
| TW | M617165 | 9/2021 |

\* cited by examiner

*Primary Examiner* — Gerald J Sufleta, II

(57) ABSTRACT

A backlight module includes that of: a substrate; a plurality of light-emitting elements, disposed on the substrate along a first direction and a second direction; and at least one optical film, comprising: a first surface, having a plurality of microstructures, the microstructures being parallel to each other, every microstructure having a first ridge, and an angle being between the first ridge and the first direction; and a second surface, corresponding to the first surface and toward the substrate, the plurality of light-emitting elements being between the substrate and the second surface; wherein a distance X is between the light-emitting element and the other light-emitting element that is adjacent to the light-emitting element along the first direction, and a distance Y is between the light-emitting element and the other light-emitting element that is adjacent to the light-emitting element along the second direction, hence a range of the angle is:

$$\left(\tan^{-1}\frac{Y}{X}\right) - 10° \leq \theta \leq \left(\tan^{-1}\frac{Y}{X}\right) + 10°.$$

11 Claims, 18 Drawing Sheets

110

114  113

BACKLIGHT MODULE

BACKGROUND OF THE INVENTION

1. Field of the Invention

The present invention is in related to a backlight module, more particularly to the backlight module applied to the field of display.

2. Description of the Prior Art

Backlight module is a major portion to the present LCD display, and has many light-emitting elements in order to be assembled for an LCD screen. To approach more average light illumination and the quality of the LCD screen, installing a diffuser plate in the direct-lit backlight module is the present application. Since the diffuser plate has textures, physical phenomena such as light refraction, reflection or scattering can then be applied to make the light illumination more evenly distributed.

To promote the contrast of the LCD display, Mini LED is gradually a major role for being a light-emitting element in the field of backlight module to be instead of regular LED. Compared with the diffusion plate in prior arts, Mini LED is able to more effectively and averagely distribute light illumination. Regarding FIG. 1A to FIG. 1D, which illustrate a schematic view of a backlight module, a schematic view of an optical film without deflective microstructures in prior arts, a schematic optical illumination distribution simulation view in prior arts, and a schematic optical illumination distribution simulation view. According to FIG. 1A, which illustrates a schematic cross-section view of a dotted line L in FIG. 1B. As shown in FIG. 1C, which illustrates a schematic optical illumination distribution simulation view produced by an A-A section line. FIG. 1D shows that the arrangements are based on FIG. 1A. That is, four adjacent Mini LEDs 12 going through the process of optical simulation produces FIG. 1D, wherein the illumination distribution is between the values of −5 and −4, and 4 and 5 along the horizontal axis.

Such backlight module 10 has a substrate 11, a plurality of Mini LEDs 12 and a plurality of prior optical films 13 without deflective microstructures. A plurality of microstructures 14 of the prior optical film 13 without deflective microstructures are arranged corresponding to the Mini LEDs 12. As it can be seen, light focus on all around where the Mini LEDs 12 are, and expand toward the longitudinal direction of the Mini LEDs 12; on the other hand, a darker area is about on the horizontal direction. Therefore, the performance of the light illumination is worse.

As it can be seen, how to solve aforesaid shortcoming becomes an important issue to persons who are skilled in the art.

SUMMARY OF THE INVENTION

The first objective of the present invention is to provide a backlight module that has a plurality of diffusion plates with deflective microstructures, so as to improve the performance of light diffusion.

A backlight module, comprises that of: a substrate; a plurality of light-emitting elements, disposed on the substrate along a first direction and a second direction; and at least one optical film, comprising: a first surface, having a plurality of microstructures, the microstructures being parallel to each other, every microstructure having a first ridge, an elongation direction of the first ridge being averagely parallel to a direction line, wherein an angle is between the direction line and the first direction; and a second surface, corresponding to the first surface and toward the substrate, the plurality of light-emitting elements being between the substrate and the second surface; wherein a distance is defined between the light-emitting element and the other light-emitting element that is adjacent to the light-emitting element along the first direction, and a distance is defined between the light-emitting element and the other light-emitting element that is adjacent to the light-emitting element along the second direction, hence a range of the angle is as that of:

$$\left(\tan^{-1}\frac{Y}{X}\right) - 10° \le \theta \le \left(\tan^{-1}\frac{Y}{X}\right) + 10°.$$

Preferably, the angle is defined as that of:

$$\theta = \tan^{-1}\frac{Y}{X}$$

Preferably, the plurality of optical films are stacked to each other, and the first ridge of the microstructures of the upper optical film are orthogonal to the first ridge of the microstructures of the lower optical film.

Preferably, the second surface further comprises a plurality of cylindrical structures, an angle being between the cylindrical structure and the first direction.

Preferably, the first ridge is shaped as a curve.

Preferably, a distance between the first ridge and the second surface is variable.

Preferably, the backlight module according to claim 1 further comprising at least one prism that is above the optical film.

Preferably, the light-emitting element is a Mini LED.

Preferably, a thickness of the optical film is between 0.05 to 0.5 mm.

Preferably, a material of the optical film is selected from the group consisting of polycarbonate (PC), polymethyl methacrylate (PMMA), and polyethylene terephthalate (PET).

Preferably, the microstructure is a triangular column structure.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

In order to describe in detail the technical content, structural features, achieved objectives and effects of the instant application, the following detailed descriptions are given in conjunction with the drawings and specific embodiments. It should be understood that these embodiments are only used to illustrate the application and not to limit the scope of the instant application.

Figure 3B:
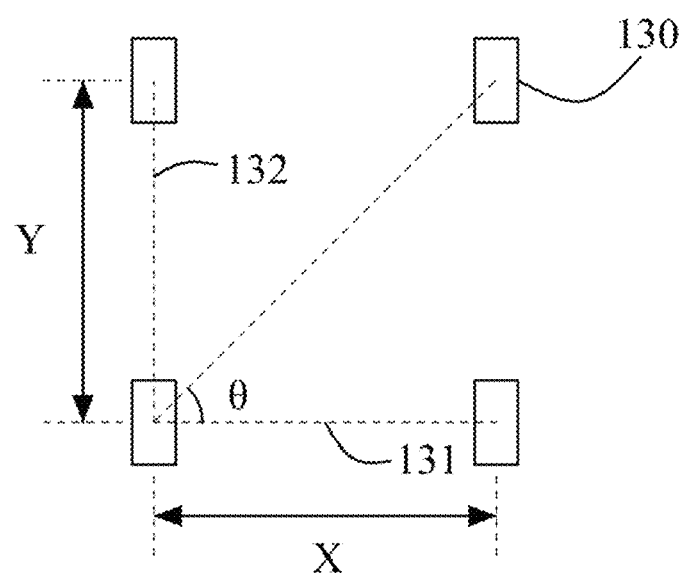
Figure 4A:
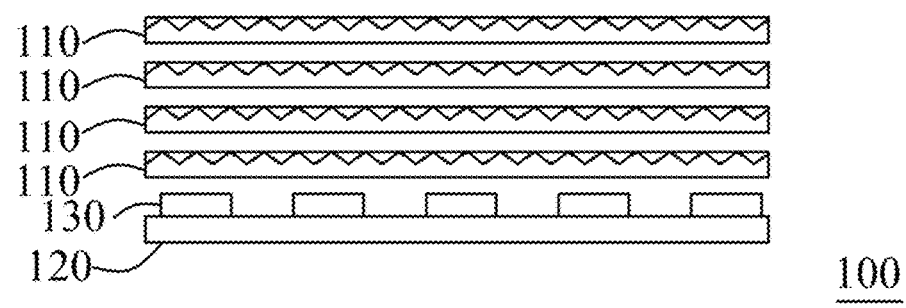
FIG. 4A illustrates a schematic view of the first preferred embodiment of the backlight module of the present invention.

With reference to FIG. 4A, which illustrates a schematic view of a first preferred embodiment of a backlight module of the present invention. As shown in FIG. 4A, a light module 100 includes a substrate 120, a plurality of light-emitting elements 130 and a plurality of optical films 110. The light-emitting elements 130 are disposed on the substrate 120 along a first direction 131 and a second direction 132, wherein the substrate 120 is a flexible substrate as an example. Referring to FIG. 3B, which illustrates a schematic view of a deflection of a microstructure of the present invention. According to FIG. 3B, the light-emitting elements 130 are arranged along the first direction 131 and the second direction 132 respectively, and the first direction 131 is perpendicular to the second direction 132.

For the first preferred embodiment, if the light-emitting elements 130 are mini LEDs, other embodiments are LEDs as well. The optical films 110 are above the light-emitting elements 130. Preferably, the thickness of the optical film 110 is between 0.05 and 0.5 mm, and the number of the optical films 110 are 2 to 4. In addition, the material of the optical film 110 is polycarbonate (PC), polymethyl methacrylate (PMMA), polyethylene terephthalate (PET), or stacked composite material of PC, PMMA and PET.

Figure 2A:
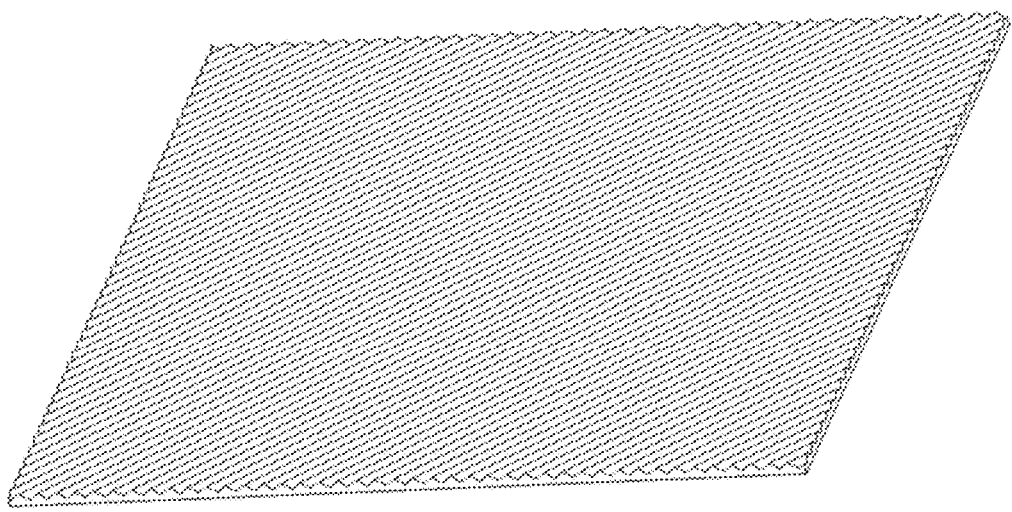
FIG. 2A illustrates a schematic view of an embodiment of the optical film of the present invention.
Figure 2B:
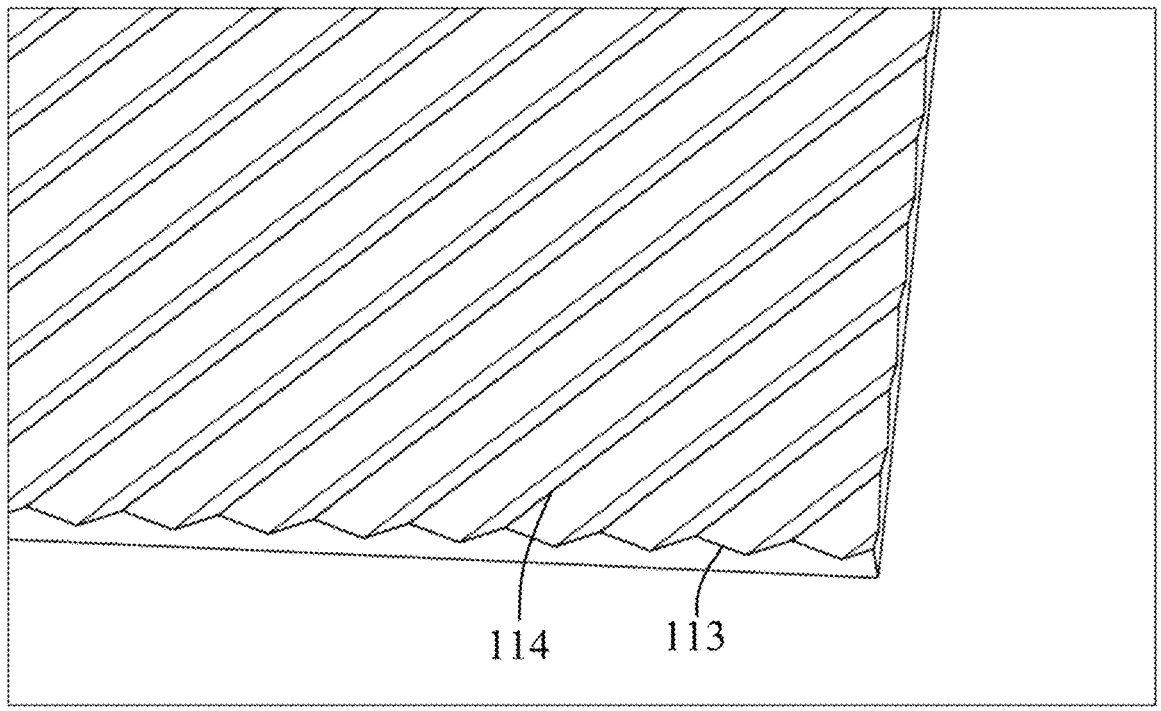
FIG. 2B illustrates a schematic partial amplified view of the embodiment of the optical film of the present invention.
Figure 2C:
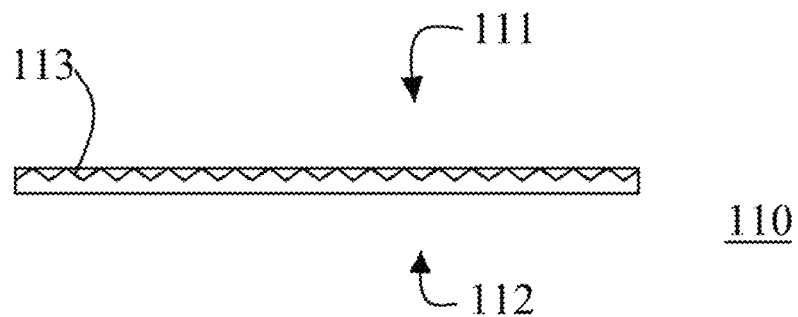
FIG. 2C illustrates a schematic lateral view of the embodiment of the optical film of the present invention.

Please refer FIG. 2A to FIG. 2C, which illustrate a schematic view of an embodiment of the optical film of the present invention, a schematic partial amplified view of the embodiment of the optical film of the present invention and a schematic lateral view of the embodiment of the optical film of the present invention. The optical film 110 includes a first surface 111 and a second surface 112, which are corresponding to each other. The second surface 112 faces to the light-emitting elements 130, and therefore the first surface 111 is on the other surface corresponding to the surface where the light-emitting elements 130 are on.

The first surface 111 of the optical film 110 further includes a plurality of microstructures 113. Each microstructure 113 has a first ridge 114. In other words, the microstructure 113 is a protruding triangular column structure. The microstructures 113 are parallel to each other, wherein an angle θ is between the first ridge 114 and the first direction 131.

Figure 3A:
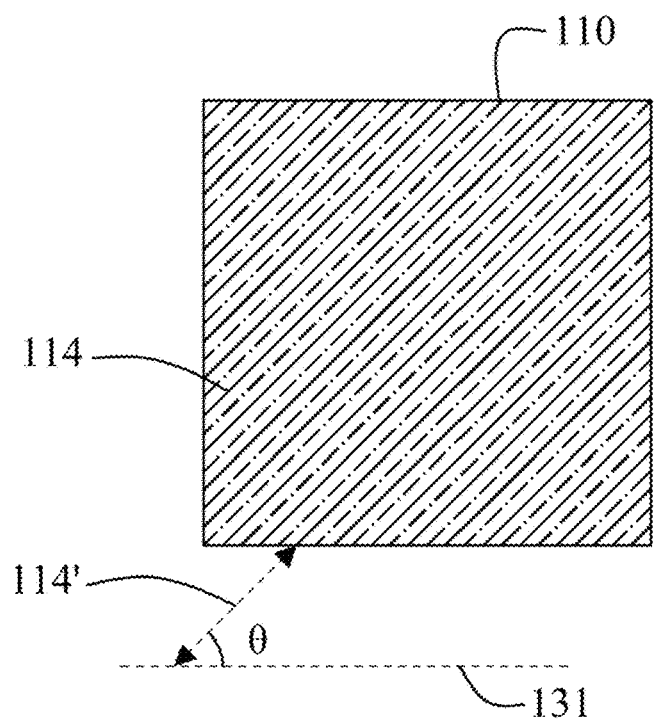
FIG. 3A and FIG. 3B illustrate schematic views of the deflection of the microstructure of the present invention.

Referring to FIG. 3A to FIG. 3B, which illustrate schematic views of the deflection of the microstructure of the present invention. The deflection angle of the microstructure 113 is related to the arrangements of the light-emitting elements 130. As shown in FIG. 3B, there are only four adjacent light-emitting elements 130 to represent the arrangements, not for the whole light-emitting elements 130. Referring to FIG. 3A, the microstructure 113 is shaped as a triangular column structure. Each dot line represents the microstructure 113, wherein each dot means a connecting point of the microstructure 113, in other words, the dot appears a sunken part. On the other hand, each solid line represents the first ridge 114, which means a top line of the microstructure 113. An elongation direction of the first ridge 114 is parallel to a direction line 114', and an angle θ is between the elongation direction of the first ridge 114 and the first direction 131. By the way, the first direction 131 and the direction line 114' are represented as vectors in FIG. 3A.

Please continuously refer to FIG. 3B, the angle θ is determined by the arrangements of the light-emitting elements 130. That is, an angle between one of the light-emitting elements 130 and the oblique-angle light-emitting element 130 is taken as the angle θ. Further definitions, the tangent function of the angle θ is equal to a distance Y between the two light-emitting elements 130 along the second direction 132 divided by a distance X between the two light-emitting elements 130 along the first $$\tan\theta = \frac{Y}{X}.$$

direction 131. The equation is Hence, the deflection angle θ of the microstructure 113 is in relationship to the arrangements of the light-emitting elements 130.

Continuously, the angle θ is equal to the arctangent function of the distance Y between the two light-emitting elements 130 along the second direction 132 divided by the distance X between the two light-emitting elements 130 along the first direction 131. The equation is θ=

$$\tan^{-1}\frac{Y}{X}.$$

The angle θ is in a certain range of tolerance. A preferred tolerance is ±10°, which means θ±10°. Frankly speaking, the range of the angle θ is represented by the following equation:

$$\left(\tan^{-1}\frac{Y}{X}\right) - 10° \le \theta \le \left(\tan^{-1}\frac{Y}{X}\right) + 10°$$

Figure 3C:
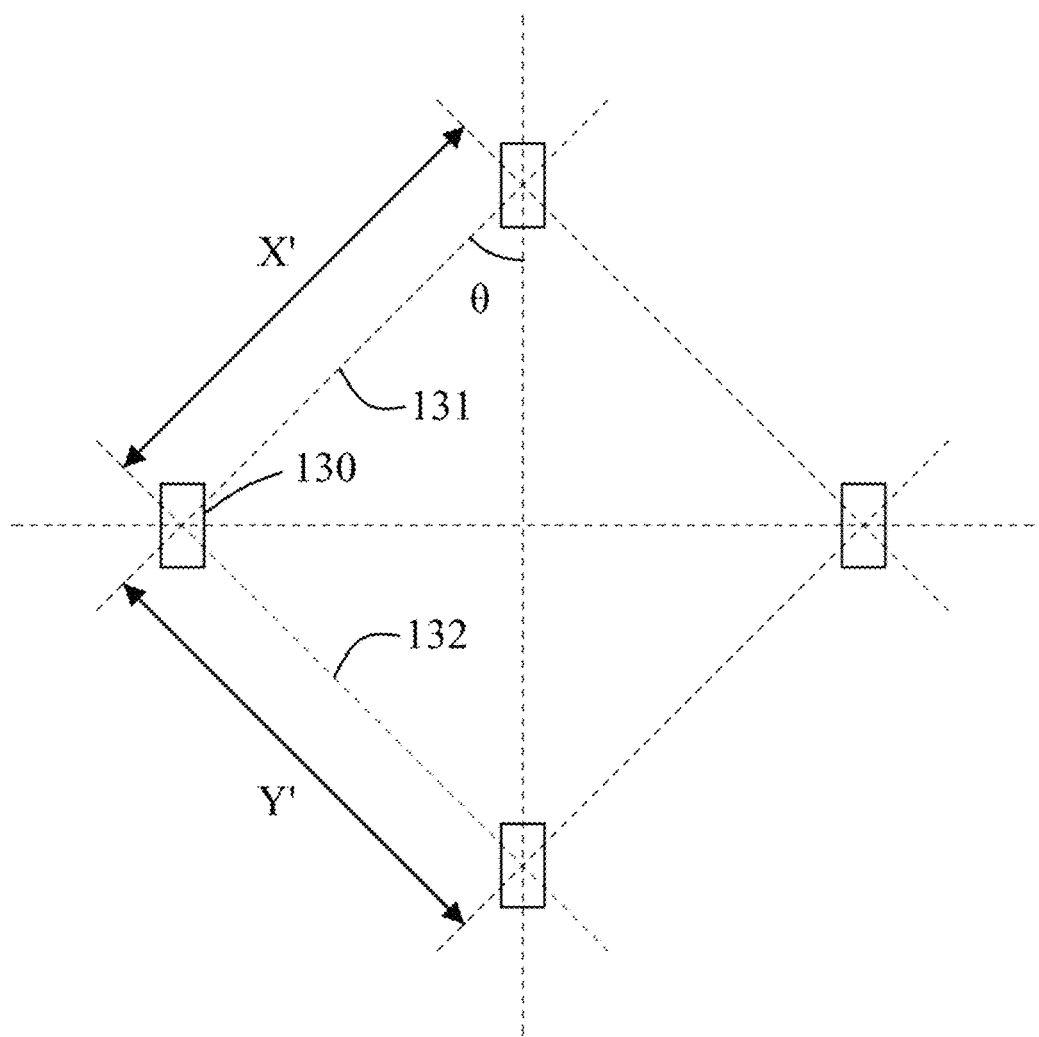
FIG. 3C illustrates a schematic view of another arrangement of the light-emitting elements of the present invention.

As shown in FIG. 3C, which illustrates a schematic view of another arrangement of the light-emitting elements of the present invention. The light-emitting elements 130 are arranged in a diamond-shaped array. In the present embodiment, the light-emitting elements 130 are still arranged along the first direction 131 and the second direction 132 respectively. The angle θ is still defined by a distance Y' between the two light-emitting elements 130 along the second direction 132 and a distance X' between the two light-emitting elements 130 along the first direction 131, that is, $$\theta = \tan^{-1}\frac{Y'}{X'}.$$

In another word, an angle θ is between the first ridge 114 of the microstructures 113 of the optical film 110 and the horizontal arrangement of the light-emitting elements 130 as always.

Figure 2D:
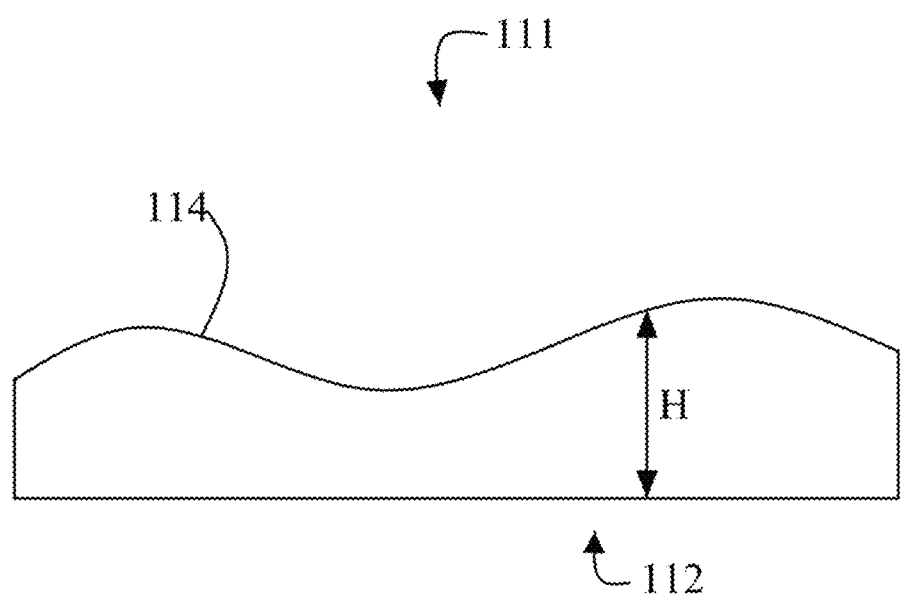
FIG. 2D illustrates a schematic longitudinal section view of another embodiment of the optical film of the present invention.

FIG. 2D illustrates a schematic longitudinal section view of another embodiment of the optical film of the present invention. The first ridge 114 is a longitudinal section line in FIG. 2D. and is a curve line. That is, a distance H between the first surface 111 and the second surface 112 is variable. In other words, the height of the microstructure 113 is in consistent corresponding to the second surface 112.

Figure 2E:
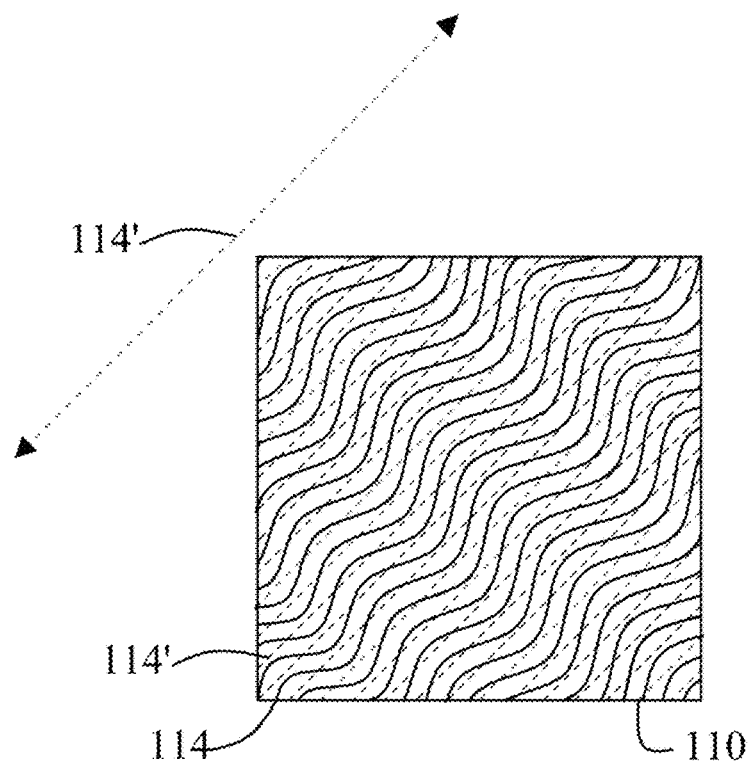
FIG. 2E illustrates a schematic top view of an embodiment of the optical film of the present invention.

FIG. 2E illustrates a schematic top view of an embodiment of the optical film of the present invention. The first ridge 114 is a curve line and the elongation direction of the first ridge 114 is parallel to the direction line 114' in FIG. 2E. In detail, the elongation direction of the first ridge 114 is variable due to that of the first ridge 114 being a curve line, but the average elongation direction of the first ridge 114 is toward to parallel to the direction line 114'. An angle 9 is between the direction line 114' and the light-emitting elements 130, therefore another angle 9 is between the direction line 114' and the first direction 131. As a conclusion, it seems that the direction line 114' is the elongation direction of the first ridge 114. The first ridge 114 in FIG. 2B is the same theory as FIG. 2E., that is, the elongation direction of the first ridge 114 is averagely parallel to the direction line 114'.

Figure 4B:
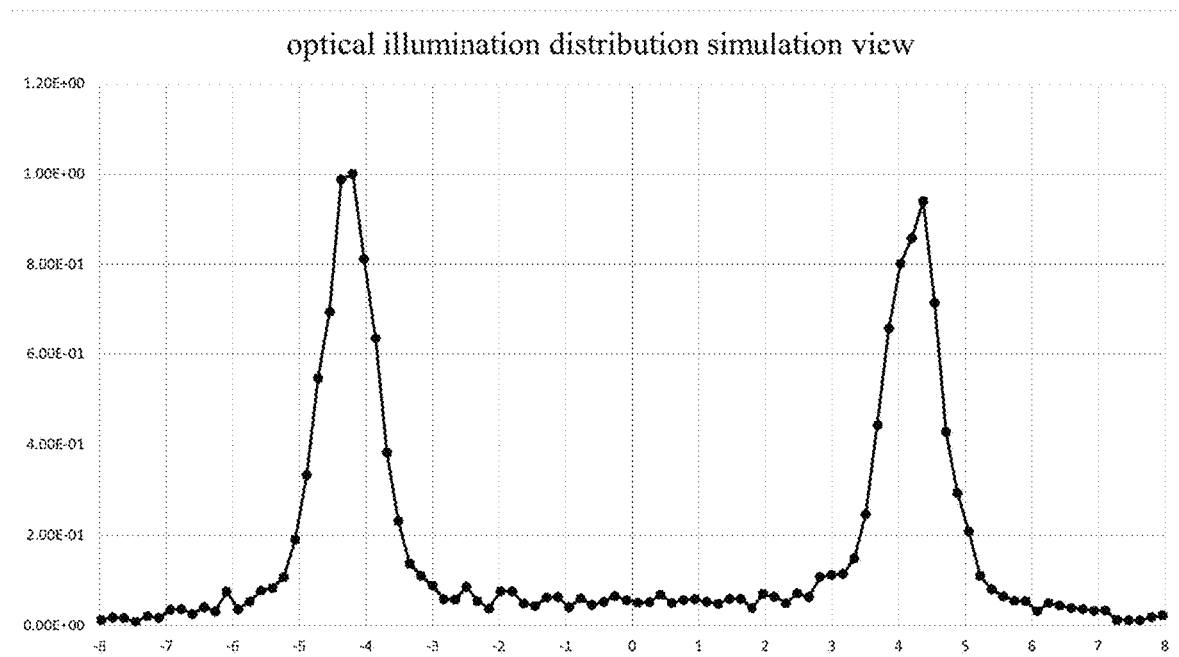
FIG. 4B illustrates a schematic optical illumination distribution simulation view of the first preferred embodiment of the backlight module of the present invention.

With reference to FIG. 4A and FIG. 4B, which illustrate a schematic view of the first preferred embodiment of the backlight module of the present invention and a schematic optical illumination distribution simulation view of the first preferred embodiment of the backlight module of the present invention. FIG. 4B is the optical illumination distribution simulation view based on the arrangements of the light-emitting elements 130 and capturing light along a diagonal line D in FIG. 3B. The light-emitting elements 130 are disposed between the value range of −5 and −4 and the other value range of 4 and 5 along the horizontal axis. Other figures as FIG. 4B, FIG. 5D, FIG. 6B, FIG. 6C, FIG. 6D, FIG. 8B, FIG. 8C, FIG. 8D, FIG. 9B FIG. 9C, and FIG. 9D are all the same as the optical illumination distribution simulation view in FIG. 3B.

Figure 1A:
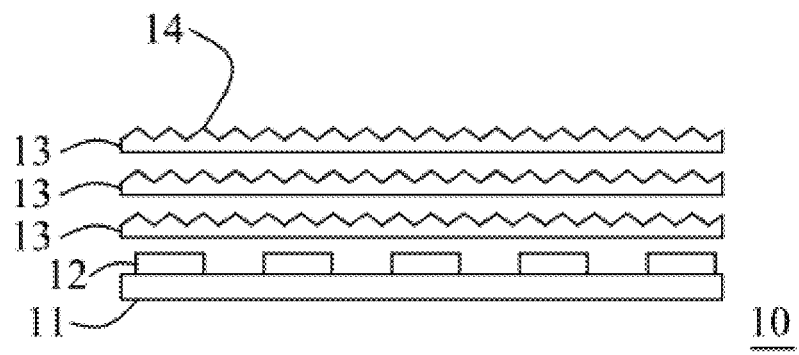
FIG. 1A illustrates a schematic view of a backlight module.

For the first preferred embodiment, the backlight module 100 includes four optical films 110 and the deflective microstructures 113. Compared with FIG. 1C, which illustrates a schematic optical illumination distribution simulation view in prior arts, a lot more distributed light points are in the central area of FIG. 4B, and therefore the illumination between the value range of −3 and 3 is obviously promoted. Compared with the backlight module 10 in FIG. 1A, it represents that the backlight module 100 has improved the diffusion effect.

Figure 5A:
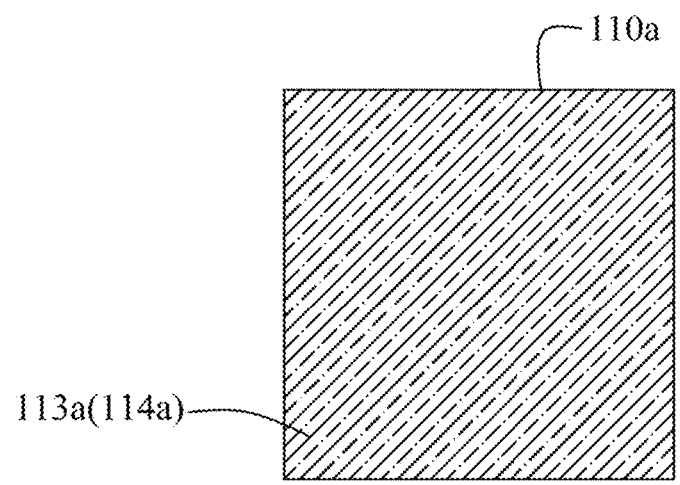
FIG. 5A to FIG. 5C illustrate a schematic view of a second preferred embodiment of the backlight module of the present invention.
Figure 5B:
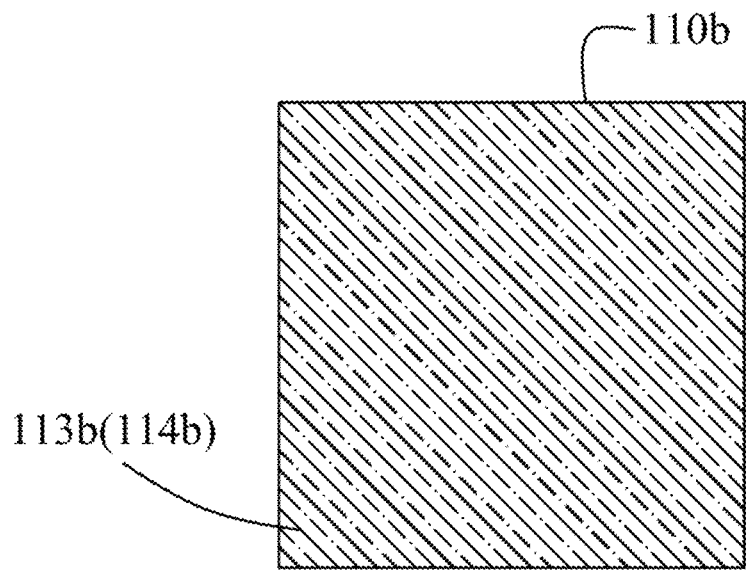
Figure 5C:
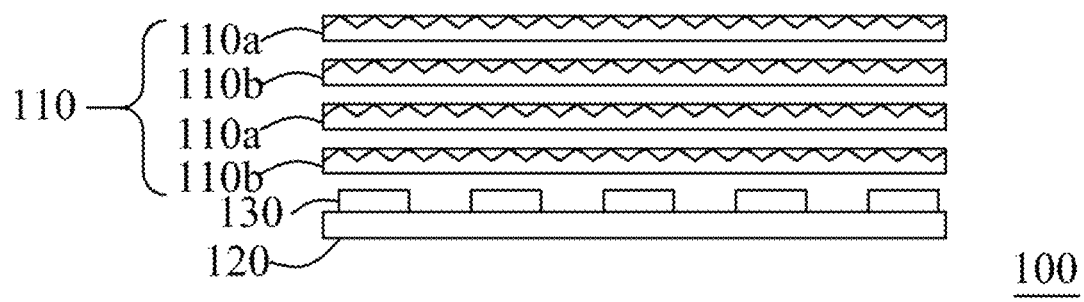

According to FIG. 5A to FIG. 5C, which illustrate a schematic view of a second preferred embodiment of the backlight module of the present invention. A backlight module 200 of the second preferred embodiment has the plurality of optical films 110 with different deflection angles, wherein they are a plurality of optical films 110a and another plurality of optical films 110b, as shown in FIG. 5A and FIG. 5B. Each set of the optical films 110a and 110b are stacked to each other above the light-emitting elements 130. In detail, the deflection angle of the optical film 110a is orthogonal to the deflection angle of the optical film 110b. That is, a first ridge 114a of a microstructure 113a of the optical film 110a is orthogonal to a first ridge 114b of a microstructure 113b of the optical film 110b.

Figure 5D:
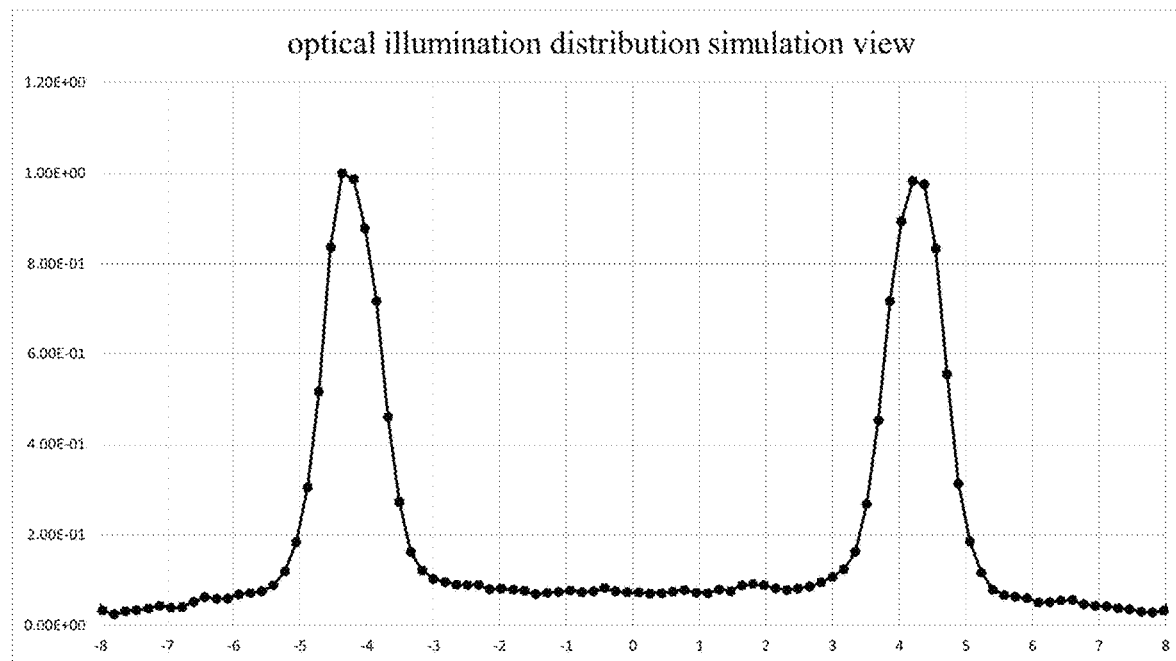
FIG. 5D illustrates a schematic optical illumination distribution simulation view of the second preferred embodiment of the backlight module of the present invention.

With respect to FIG. 5D, which is a schematic optical illumination distribution simulation view of the second preferred embodiment of the backlight module of the present invention. As shown in FIG. 5, the two stacked orthogonal optical films 110a and 110b make the effect of light diffusion more uniform.

Figure 6A:
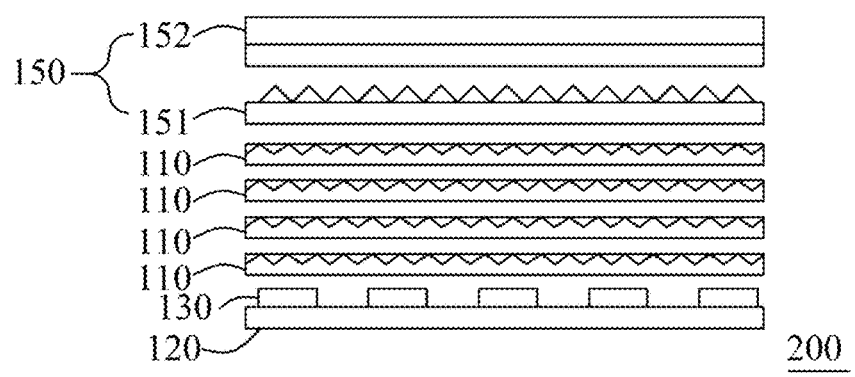
FIG. 6A, which illustrates a schematic view of a third preferred embodiment of the backlight module of the present invention.

Please refer to FIG. 6A, which illustrates a schematic view of a third preferred embodiment of the backlight module of the present invention. A backlight module 200 of the third preferred embodiment adopts a plurality of prism set 150 above the optical films 110. The prism set 150 includes a first prism 151 and a second prism 152, which are perpendicular to each other. Specifically, there are directional microstructures disposed on the first prism 151 and the second prism 152 respectively, and the two directional microstructures are perpendicular to one another.

Figure 1B:
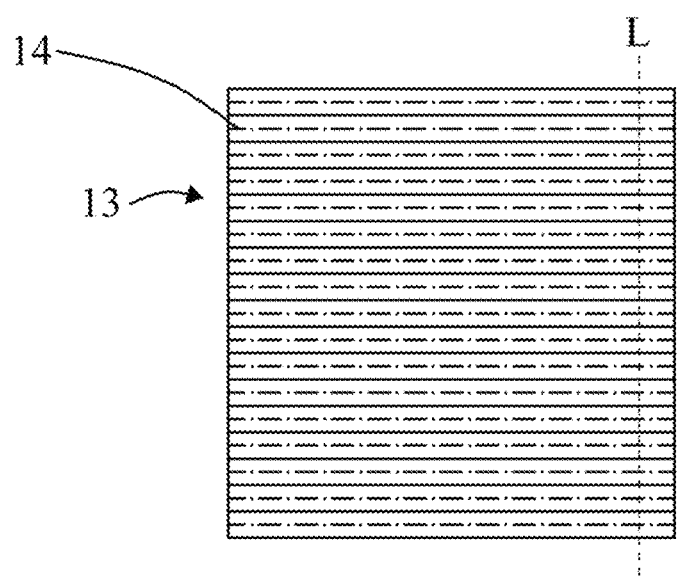
FIG. 1B illustrates a schematic view of an optical film without deflective microstructures in prior arts.
Figure 1C:
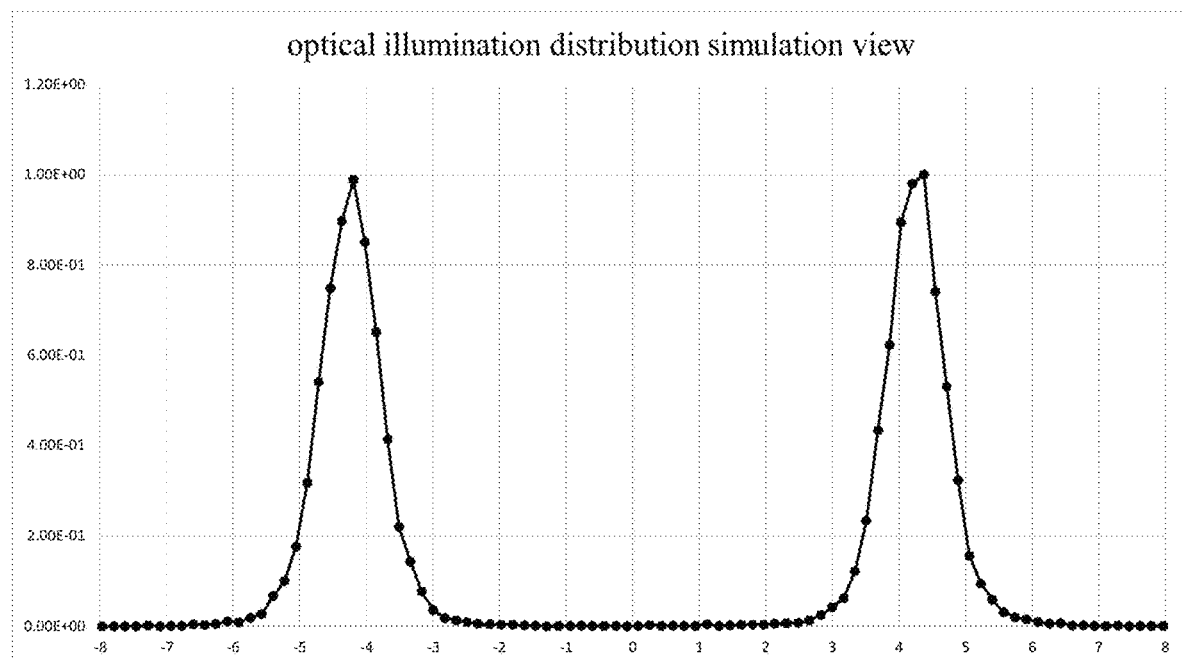
FIG. 1C illustrates a schematic optical illumination distribution simulation view in prior arts.
Figure 1D:
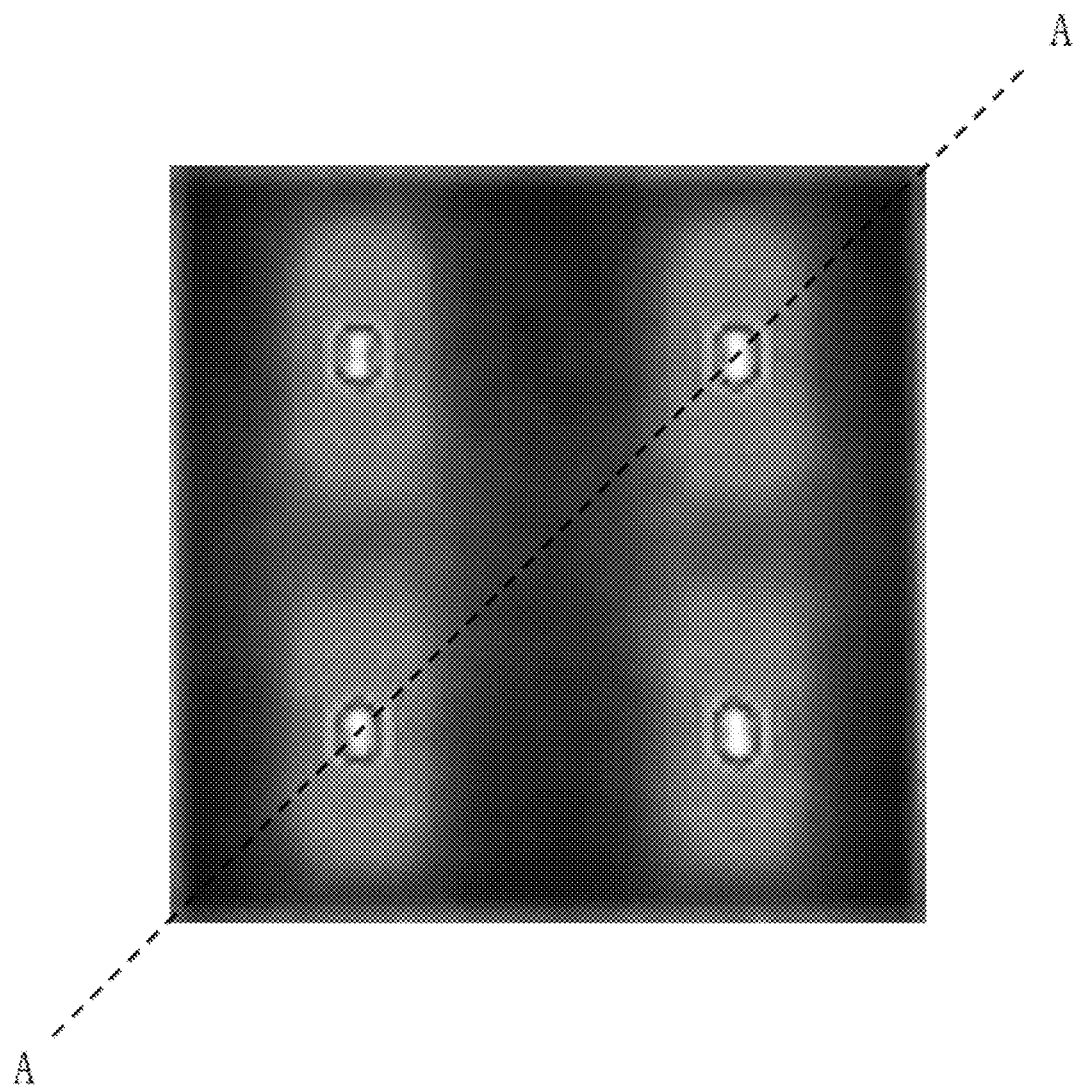
FIG. 1D illustrates a schematic optical illumination distribution simulation view.
Figure 6B:
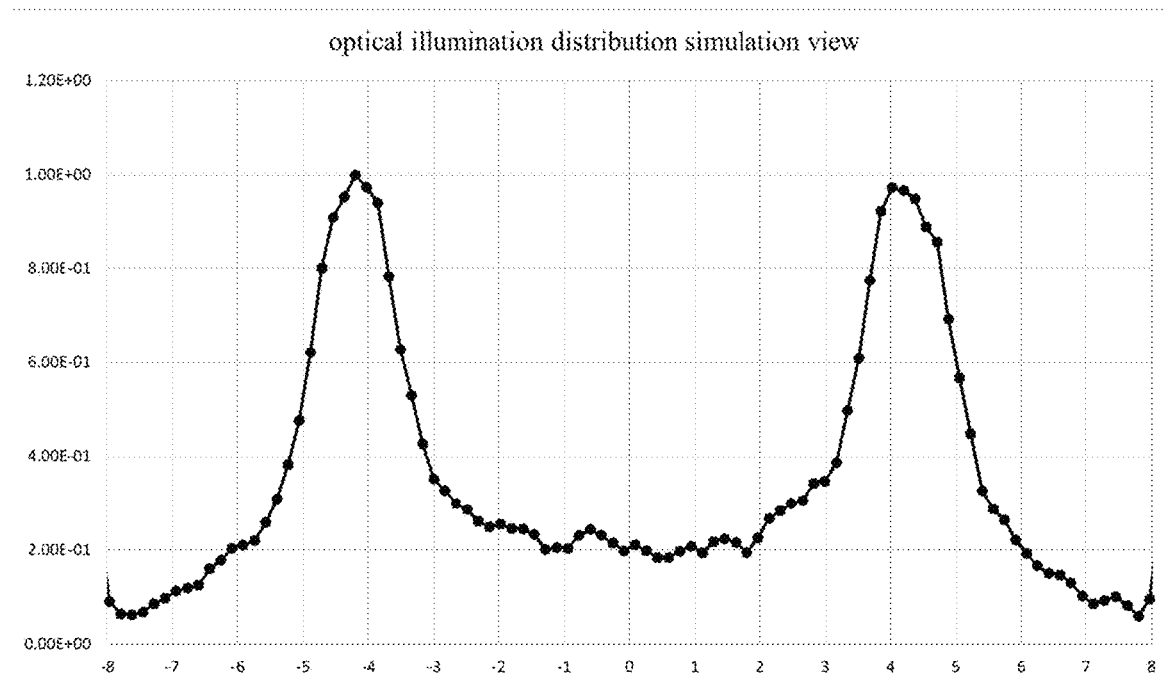
FIG. 6B illustrate a schematic optical illumination distribution simulation view, compared with FIG. 6C, of a backlight module with different optical films of the third preferred embodiment of the present invention.
Figure 6C:
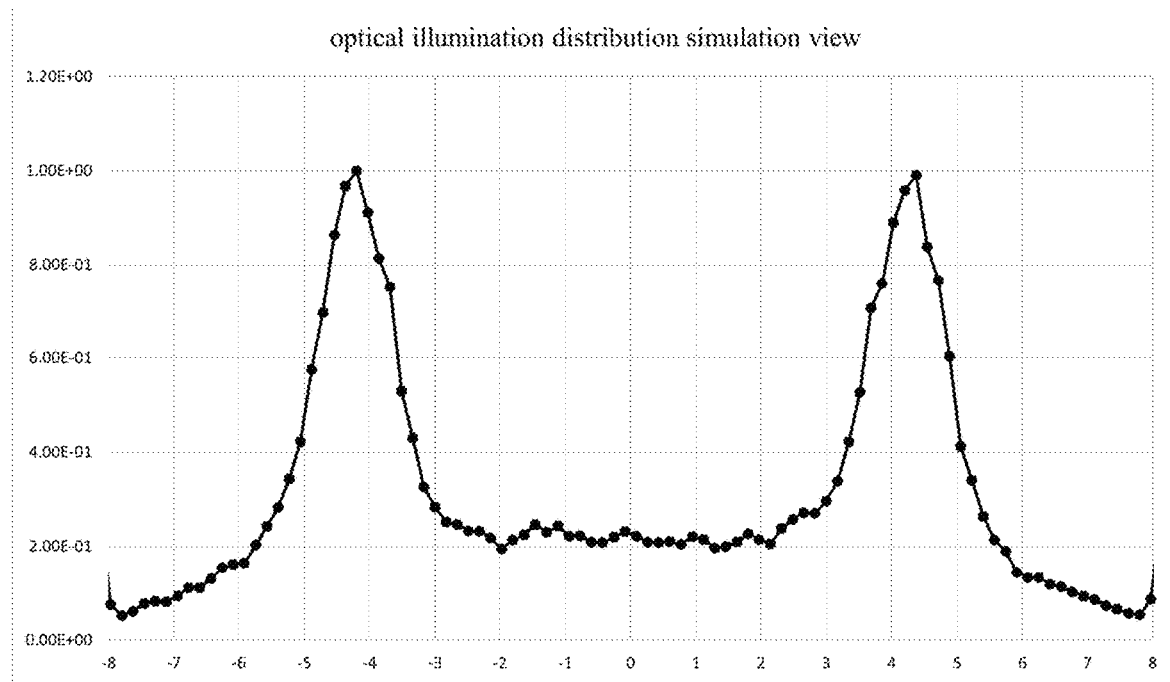
FIG. 6C illustrates a schematic optical illumination distribution simulation view of a backlight module of the third preferred embodiment of the present invention.

Then, go to FIG. 6B and FIG. 6C, which illustrate a schematic optical illumination distribution simulation view, compared with FIG. 6C, of a backlight module with different optical films of the third preferred embodiment of the present invention and a schematic optical illumination distribution simulation view of a backlight module of the third preferred embodiment of the present invention. FIG. 6B is based on the backlight module 200 with the optical films 13 that have no deflective microstructures, as shown in FIG. 1B. Compared FIG. 6B with FIG. 6C, the high-brightness areas are mostly concentrated around the light-emitting points, and the central area between the light-emitting elements is relatively dim in FIG. 6B; on the other hand, the high-brightness areas are spread, in order to effectively distribute light to the central area in FIG. 6C.

Figure 6D:
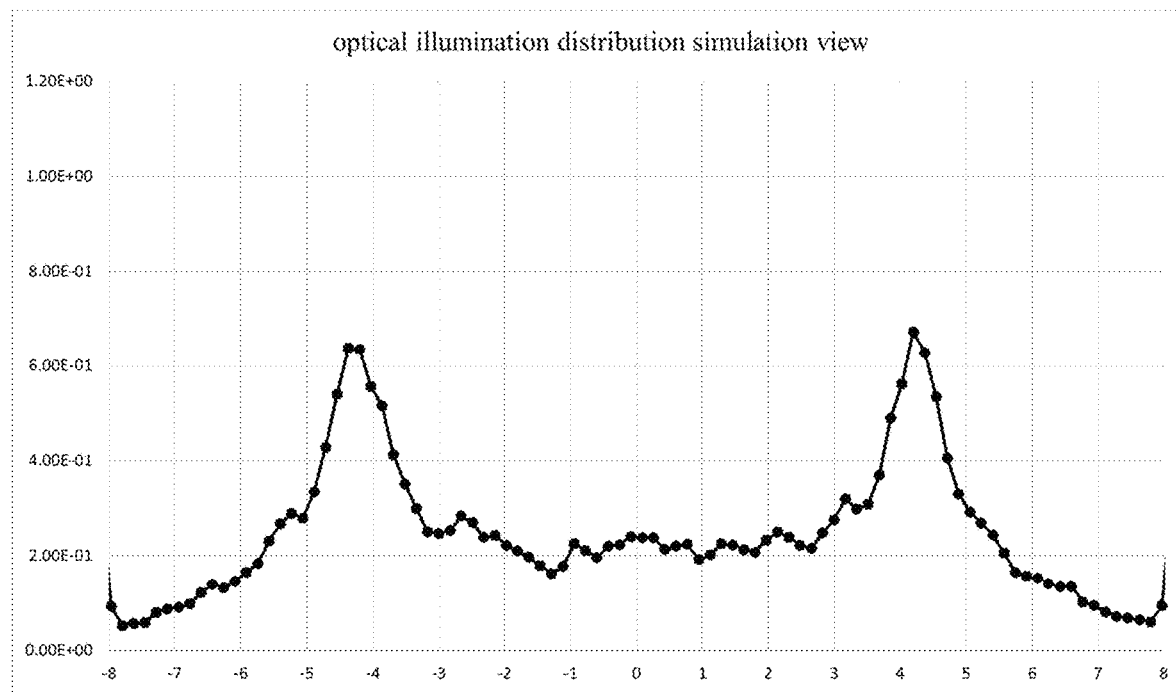
FIG. 6D illustrates a schematic optical illumination distribution simulation view of the third preferred embodiment adopting the optical films orthogonal to each other of the present invention.

With regard to FIG. 6D, which illustrates a schematic optical illumination distribution simulation view of the third preferred embodiment adopting the optical films orthogonal to each other of the present invention. That is, according to FIG. 6A, the optical films 110 are orthogonal to each other as shown from FIG. 5A to FIG. 5C, so as to produce the optical illumination distribution simulation view. It appears that the light is further diffused and the brightness is averagely distributed, therefore the phenomenon of the brightness focusing on the light source is changed.

Figure 7A:
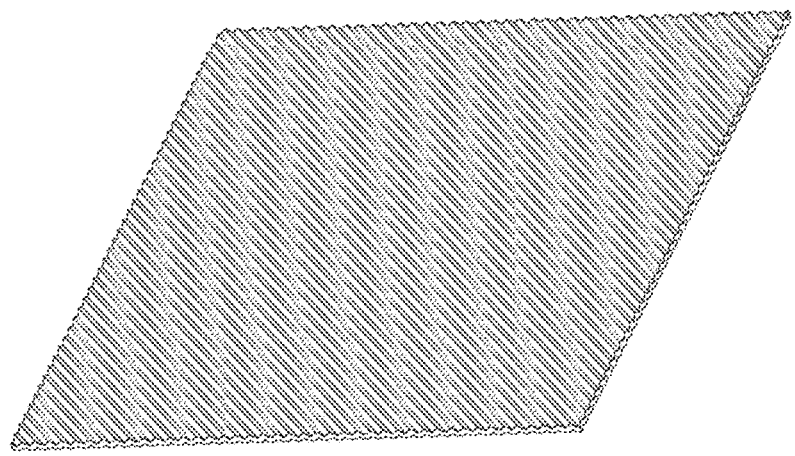
FIG. 7A illustrates a schematic back view of a fourth preferred embodiment of the optical film of the present invention.
Figure 7B:
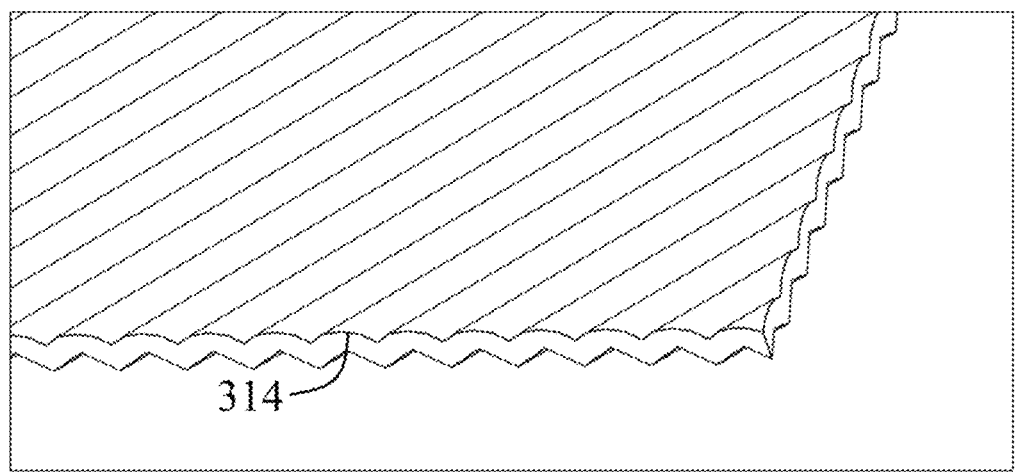
FIG. 7B illustrates a schematic back partial amplified view of the embodiment of the optical film of the present invention.
Figure 7C:
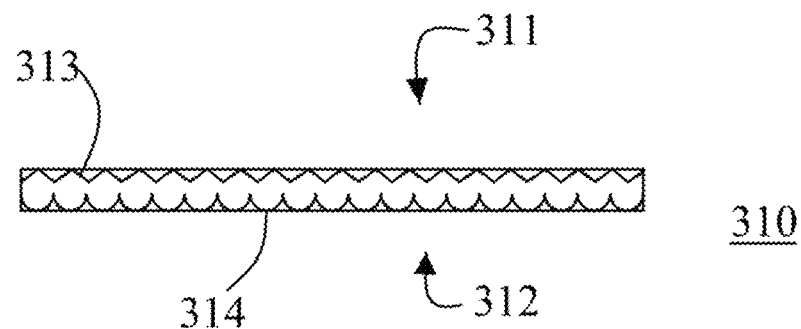
FIG. 7C illustrates a schematic lateral view of the embodiment of the optical film of the present invention.

With reference to FIG. 7A to FIG. 7C, which illustrate a schematic back view of a fourth preferred embodiment of the optical film of the present invention, a schematic back partial amplified view of the embodiment of the optical film of the present invention and a schematic lateral view of the embodiment of the optical film of the present invention. For the embodiment, an optical film 310 includes a first surface 311 and a second surface 312. The first surface 311 includes a plurality of microstructures 313, and the microstructures 313 are the same as FIG. 2C, it will not be described any further hereinafter. The second surface 312 further includes a plurality of cylindrical structures 314, and every single arc arched structure 314 is a lenticular. In some embodiments, an angle θ is between the elongation direction of the arc arched structure 314 and the first direction 131 of the light-emitting elements 130. That is, the direction of arranging the cylindrical structures 314 is the same as the direction of the microstructures 313 of the first surface 311.

Figure 8A:
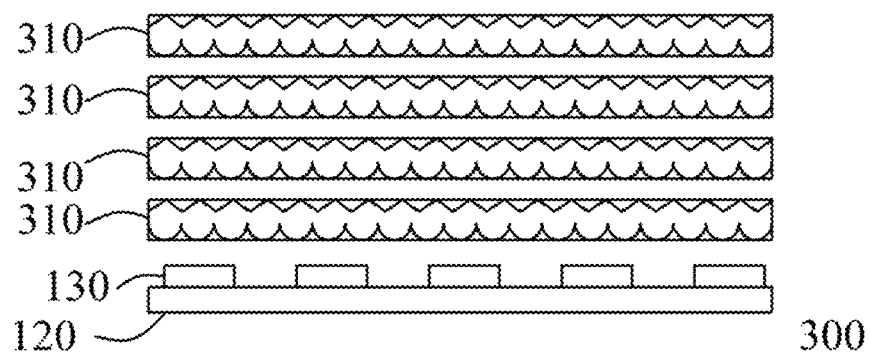
FIG. 8A illustrates a schematic view of a fourth preferred embodiment of the backlight module of the present invention.

With reference to FIG. 8A, which illustrates a schematic view of a fourth preferred embodiment of the backlight module of the present invention. A backlight module 300 includes the plurality of optical films 310 disposed above the light-emitting elements 130, and the cylindrical structures 314 of the optical films 310 are formed toward the light-emitting elements 130.

Figure 8B:
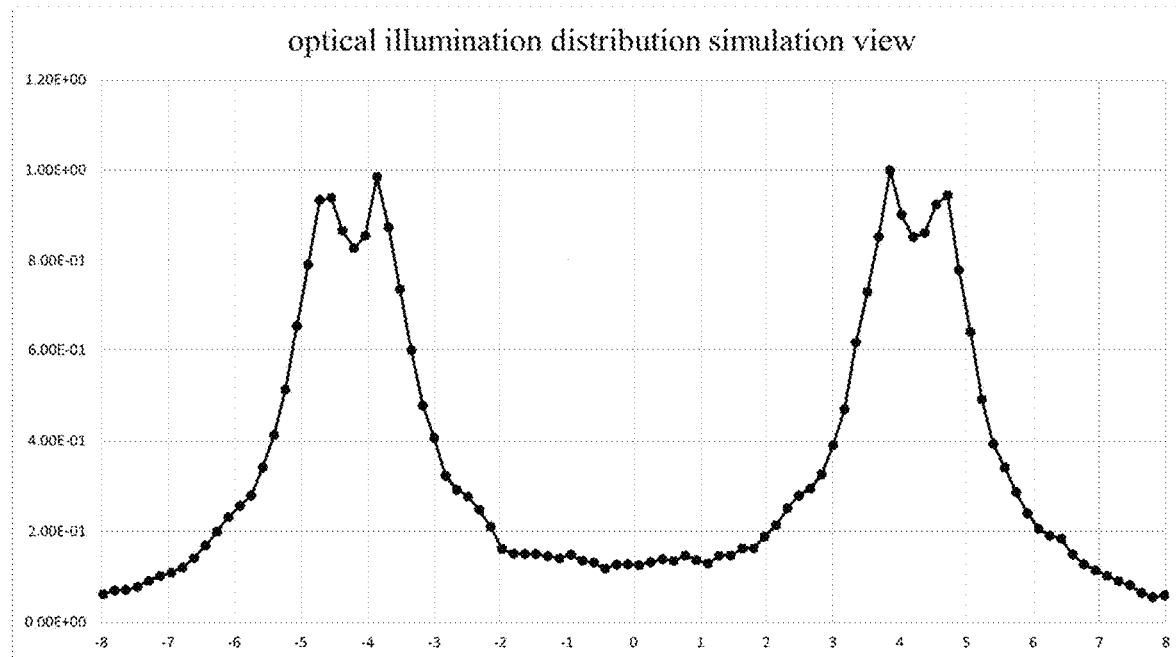
FIG. 8B illustrates a schematic optical illumination distribution simulation view comparing with FIG. 8C.
Figure 8C:
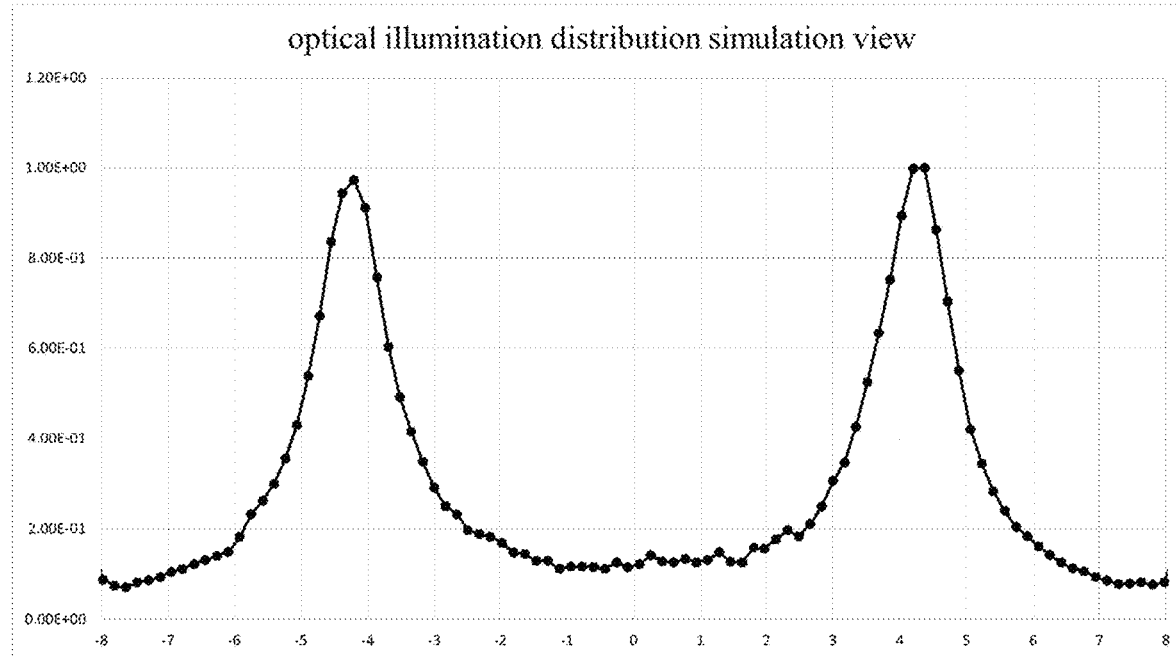
FIG. 8C illustrates a schematic optical illumination distribution simulation view of the fourth preferred embodiment of the backlight module of the present invention.

Please refer to FIG. 8B and FIG. 8C, which illustrate a schematic optical illumination distribution simulation view comparing with FIG. 8C and a schematic optical illumination distribution simulation view of the fourth preferred embodiment of the backlight module of the present invention. The backlight module 300 as a basic technology installs the optical films without deflective cylindrical structures, to be instead of the optical film 310, so as to produce such optical illumination distribution simulation view, as shown in FIG. 8B. It can be seen that the high illumination areas are distributed on the light points in FIG. 8B, and the central area is obviously darker. According to FIG. 8C, the light is averagely distributed and compensates the darker central area after deflecting the microstructures 313 and the cylindrical structures 314.

Figure 8D:
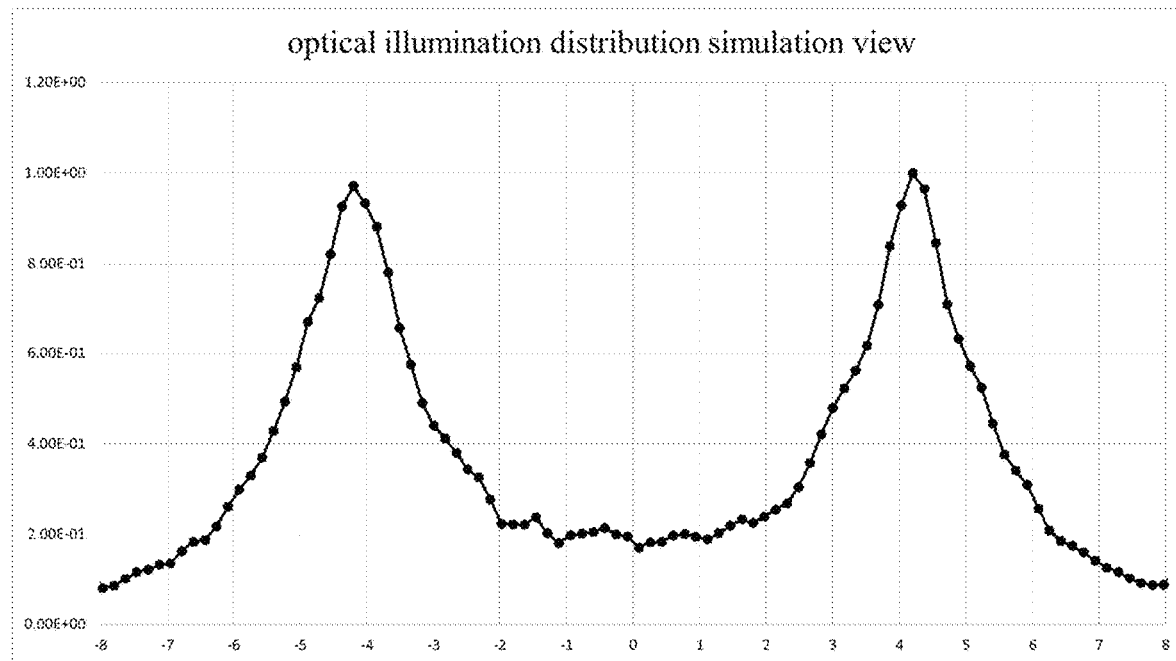
FIG. 8D illustrates a schematic optical illumination distribution simulation view of the fourth preferred embodiment adopting the optical films orthogonal to each other of the present invention.

With regard to FIG. 8D, which illustrates a schematic optical illumination distribution simulation view of the fourth preferred embodiment adopting the optical films orthogonal to each other of the present invention. That is, according to FIG. 8A, the optical films 310 are orthogonal to each other as shown from FIG. 5A to FIG. 5C, so as to produce the optical illumination distribution simulation view. It appears that the light is further diffused and the brightness is averagely distributed and covers the whole darker area.

Figure 9A:
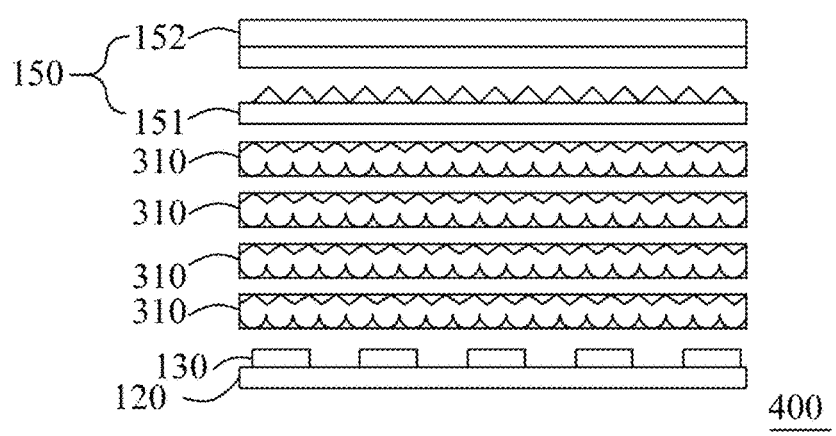
FIG. 9A illustrates a schematic view of a fifth preferred embodiment of the backlight module of the present invention.
Figure 9B:
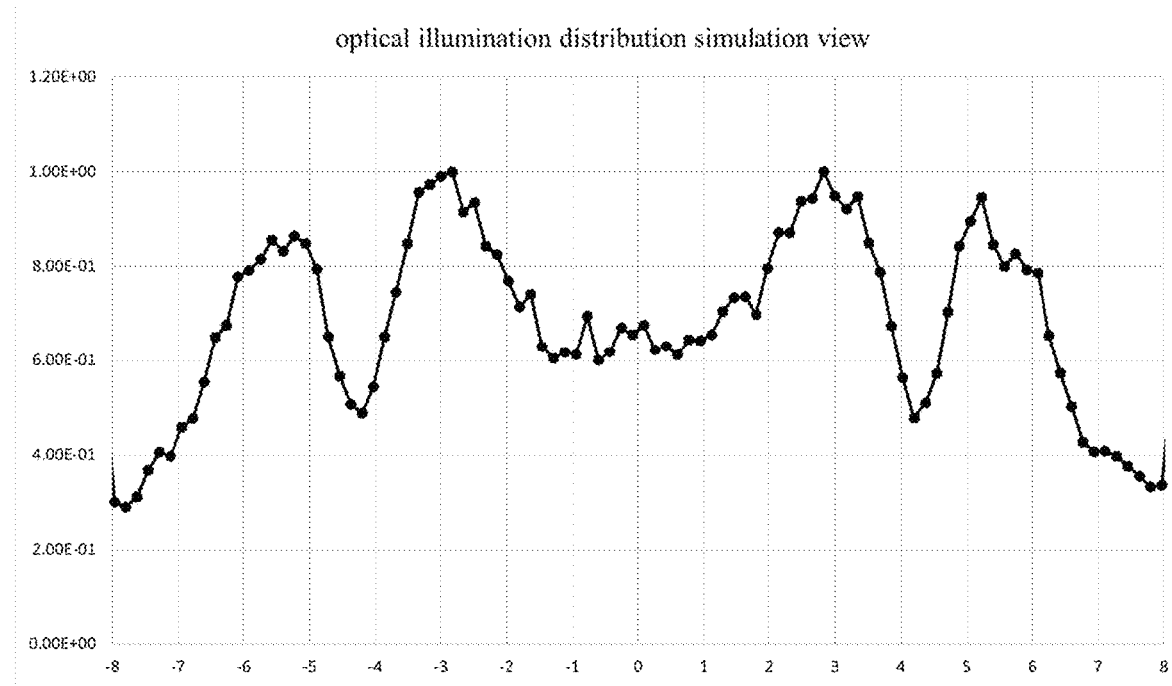
FIG. 9B illustrates a schematic optical illumination distribution simulation view, compared with FIG. 9C, of the backlight module without deflective microstructures.
Figure 9C:
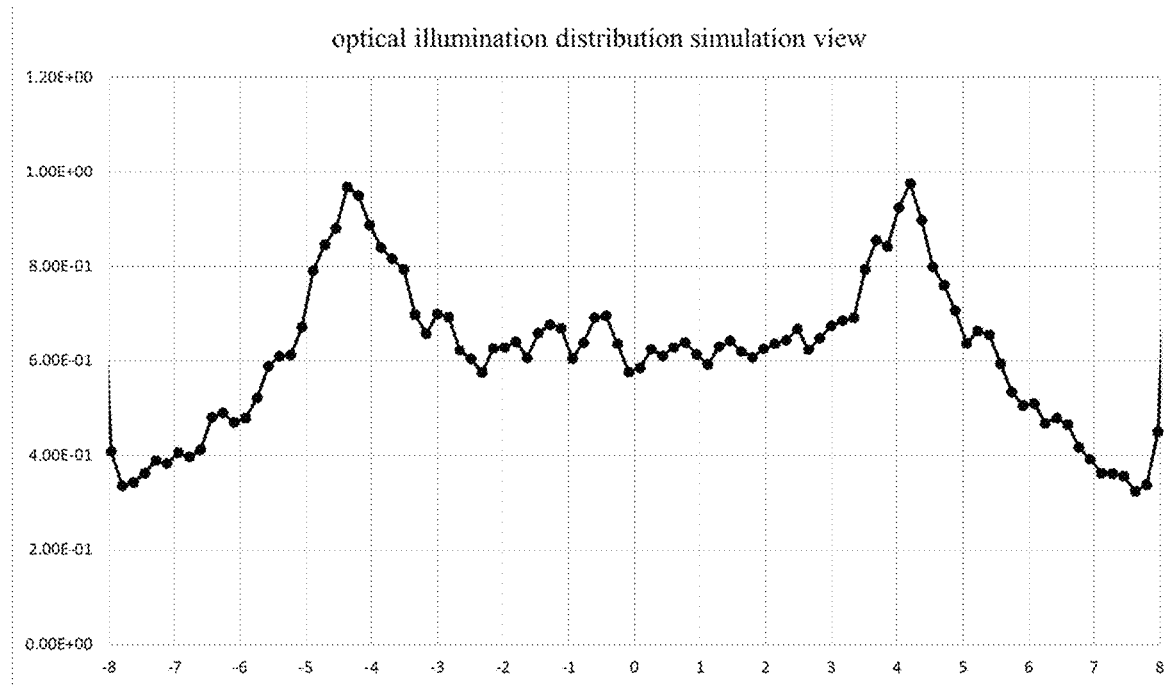
FIG. 9C illustrates a schematic optical illumination distribution simulation view of the fifth preferred embodiment of the backlight module of the present invention.

Regarding to FIG. 9A, which illustrates a schematic view of a fifth preferred embodiment of the backlight module of the present invention. A backlight module 400 of the fifth preferred embodiment adopts the prism set 150 above the optical films 310. The prism set 150 is disclosed in FIG. 6A as the second embodiment, and it is not described any further hereinafter. With respect to FIG. 9B and FIG. 9C, which illustrate a schematic optical illumination distribution simulation view, compared with FIG. 9C, of the backlight module without deflective microstructures and a schematic optical illumination distribution simulation view of the fifth preferred embodiment of the backlight module of the present invention. In fact, FIG. 9B is the optical illumination distribution simulation view compared with FIG. 9C. As shown in FIG. 9B, which adopts the backlight module 400 as a basic technology to install an optical film without deflective cylindrical structures, to be instead of the optical film 310, so as to produce such optical illumination distribution simulation view. As shown in FIG. 9B, the light is a little scattered, but the center of the light source is dim after installing the prism set 150, and the overall brightness is low. According to FIG. 9C, the light is distributed more even, and the brightness is decayed not much. That is, even though the light is scattering, the brightness is still kept a certain level.

Figure 9D:
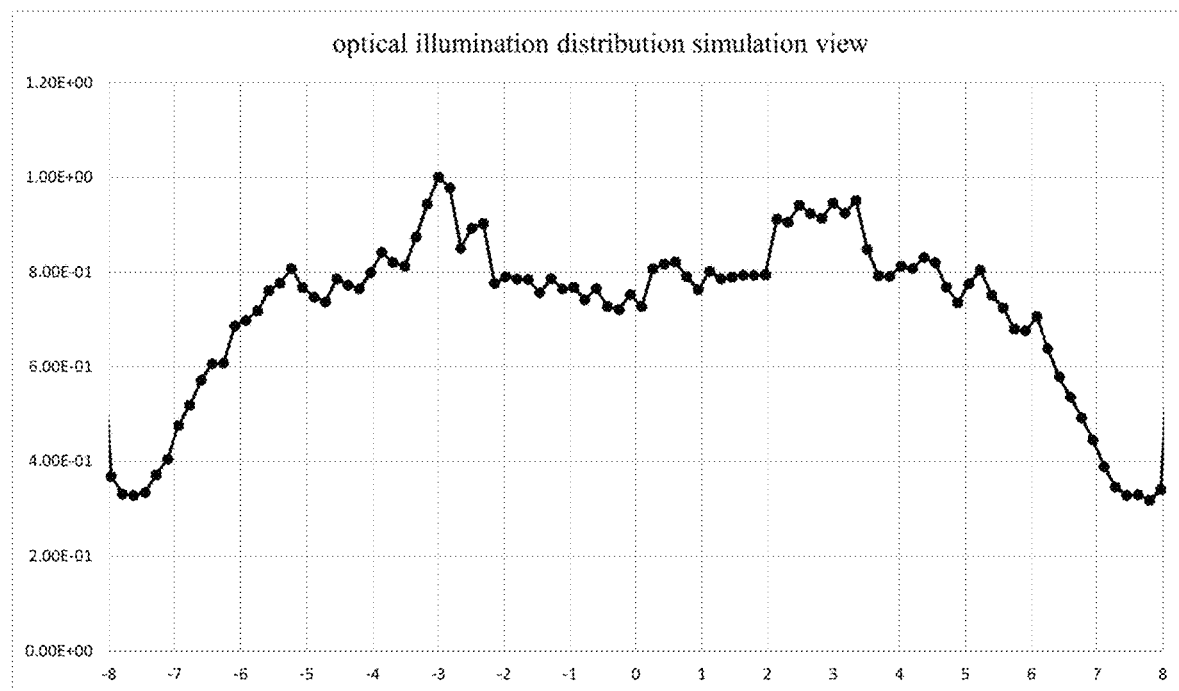
FIG. 9D illustrates a schematic optical illumination distribution simulation view of the sixth preferred embodiment of the present invention.

Regarding to FIG. 9D, which illustrates a schematic optical illumination distribution simulation view of the sixth preferred embodiment of the present invention. That is, according to FIG. 9A, the optical films 310 are stacked and orthogonal to each other. It seems the scattering effect of the light is very well, and the brightness is averagely distributed and covers the whole light area.

The present invention provides the backlight module that comprises the optical films, wherein the optical film has the deflective microstructure 313 and the deflective cylindrical structure 314, and the optical films are stacked with orthogonality, so as to effectively improve the light diffusion and scattering of the light-emitting elements 130. As it can be seen, the light illumination is able to cover the whole area. Compared with prior arts, the present invention increases light performance, even the density of the light-emitting elements 130 is reduced, which means the cost is lower down.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A backlight module, comprising:
    a substrate;
    a plurality of light-emitting elements, disposed on the substrate along a first direction and a second direction; and
    at least one optical film, comprising:
        a first surface, having a plurality of microstructures, the microstructures being parallel to each other, every microstructure having a first ridge, an extension direction of the first ridge being parallel to a direction line on average, wherein an angle is between the direction line and the first direction; and
        a second surface, corresponding to the first surface and toward the substrate, the plurality of light-emitting elements being between the substrate and the second surface;
    wherein a distance X is defined between the light-emitting element and the other light-emitting element that is adjacent to the light-emitting element along the first direction, and a distance Y is defined between the light-emitting element and the other light-emitting element that is adjacent to the light-emitting element along the second direction, hence a range of the angle is as that of:

$$\left(\tan^{-1}\frac{Y}{X}\right) - 10° \le \theta \le \left(\tan^{-1}\frac{Y}{X}\right) + 10°.$$

2. The backlight module according to claim 1, wherein the angle is defined as that of:

$$\theta = \tan^{-1}\frac{Y}{X}.$$

3. The backlight module according to claim 1, wherein the plurality of optical films is stacked to each other, and the first ridge of the microstructures of the upper optical film are orthogonal to the first ridge of the microstructures of the lower optical film.

4. The backlight module according to claim 1, wherein the second surface further comprises a plurality of cylindrical structures.

5. The backlight module according to claim 4, wherein the angle is between the cylindrical structure and the first direction.

6. The backlight module according to claim 1, wherein the first ridge is shaped as a curve.

7. The backlight module according to claim 1, wherein a distance between the first ridge and the second surface is variable.

8. The backlight module according to claim 1 further comprising at least one prism that is above the optical film.

9. The backlight module according to claim 1, wherein the light-emitting element is a Mini LED.

10. The backlight module according to claim 1, wherein a thickness of the optical film is between 0.05 to 0.5 mm.

11. The backlight module according to claim 1, wherein a material of the optical film is selected from the group consisting of polycarbonate, polymethyl methacrylate, and polyethylene terephthalate.

\* \* \* \* \*